Figure 1:
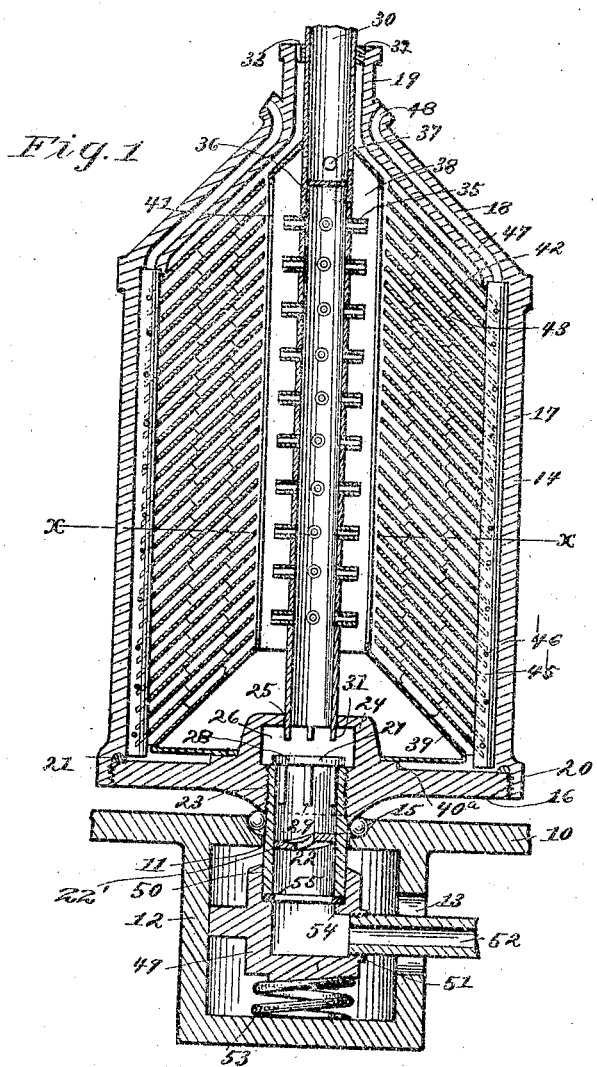

H. O. FISHER.
CREAM SEPARATOR.
APPLICATION FILED APR. 20, 1907.

1,008,896.

Patented Nov. 14, 1911.

Witnesses:
Arthur F. Kwis
Rar Chriss

Inventor:
Homer O. Fisher,
by
B.W. Brockett.
Attorney.

UNITED STATES PATENT OFFICE.

HOMER O. FISHER, OF RAVENNA, OHIO.

CREAM-SEPARATOR.

1,008,896.  Specification of Letters Patent.  Patented Nov. 14, 1911.

Application filed April 20, 1907. Serial No. 369,329.

*To all whom it may concern:*

Be it known that I, HOMER O. FISHER, residing at Ravenna, in the county of Portage and State of Ohio, have invented a certain new and useful Improvement in Cream-Separators, of which the following is a full, clear, and exact description, reference being had to the accompanying drawings.

My invention relates to centrifugal cream separators.

In a usual or common construction of cream separators, the rotary receptacle or bowl is provided with a hollow spindle the upper end of which is connected by a pipe or tube to a tank containing the milk to be separated, which tank is located above the separator so that a sufficient head or pressure is obtained to force the milk through the bowl. From the hollow spindle the milk spreads over the surfaces of so-called disks surrounding the spindle, and by the rapid rotation of the bowl the cream is separated, the skim milk collecting at the outer portion or periphery of the bowl and the cream at the center. The skim milk and cream then pass upward and out of the bowl through separate passageways provided at the top thereof.

One of the objects of my invention is to provide means whereby the labor involved in handling and lifting the milk before it is passed through a separator is materially lessened.

A further object is to improve the efficiency of cream separators so that larger quantities of milk can be handled in a given space of time than with the separators heretofore employed.

Further objects will appear from the detailed description in the specification.

In carrying out the first object of my invention I supply the milk through the bottom of the bowl, the parts being so arranged and constructed that the milk is forced or drawn through the bowl by so-called suction or by the partial vacuum created by the rotation of the bowl and parts therein. In other words the separator acts as a centrifugal pump to force the milk through the bowl. Thus it is unnecessary to lift the milk to a tank above the separator but the tank can be on the same level with the separator or even below it.

I further provide improvements in the construction and arrangements of the various parts on the interior of the bowl so that the milk may be more uniformly distributed to the rotating liner provided therein and the cream more thoroughly separated, and also in order that the cream and skim milk may be drawn from the bowl with less liability of slogging the parts.

My invention may be further characterized as consisting in certain novel details of construction and combinations and arrangements of parts which will be more fully described in the specification and set forth in the appended claims.

Reference is now had to the accompanying drawings showing a cream separator equipped with the various features of my invention, in which—

Figure 2:
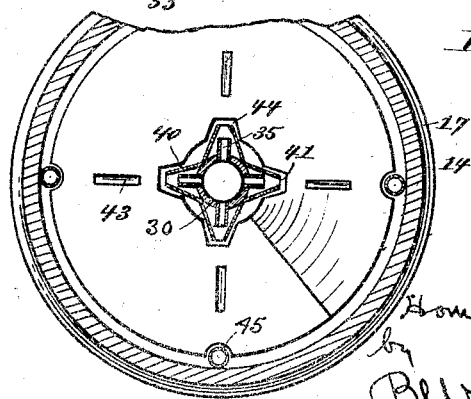

Figure 1 is a vertical section of the same, and Fig. 2 is a transverse section approximately along the line $x$—$x$ of Fig. 1.

The rotary portions of the cream separator are supported on a suitable frame 10 having a central opening 11, the upper portion of the wall of which is rounded or curved forming a ball race, which opening communicates with a chamber 12, which may be cylindrical in form, having in the side wall an opening 13 the purpose of which will be explained.

At 14 is shown a rotary receptacle or so-called bowl supported on ball bearing 15 in the ball race. The bowl comprises a disk-like base 16 having a threaded periphery and a removable top or body consisting of a cylindrical portion 17, and an upper cone shaped top portion 18 having a cylindrical open neck 19. The bottom of the cylindrical portion 17 of the bowl is provided with an internally threaded flange 20 which screws on to the threaded periphery of the base 16, suitable packing 21 being provided, so as to form a tight joint. The base 16 is provided with a downwardly extending tubular portion which consists in this case of a short pipe 22 screwed into a centrally located opening 23. The base is also provided on its inner side with a flange-like boss 24 provided with a centrally located threaded opening 25 slightly smaller than the opening 23. The opening 25 communicates with a chamber 26 for a valve 27 consisting of a disk or plate 28 which normally rests upon the upper end of the tube 22 when the bowl is stationary so as to close the opening in said tube, and a plurality of inwardly extending fingers 29, which engage the inner surface of the tube.

Extending down into the bowl through the opening in the neck portion 19 is a hollow vertical spindle or tube 30 which is threaded at its lower end and is screwed into the threaded opening 25 in the boss 24. The spindle is provided at its lower end with a number of fingers or projections 31, which acts as a stop to limit the upward movement of the valve 27, as will be explained more fully. The tube is smaller in diameter than the upper opening in the neck 19 of the bowl and is centered therein by a ring or collar 32 which may be secured to the tube in any desired manner and fits snugly within said opening. This ring or collar 32 is provided with one or more openings 33 through which the cream passes as will be explained.

The spindle 30 is provided on the interior of the bowl with a plurality of vertical rows or series of lateral hollow tubular projections consisting, in this case of short tubes 35 secured in openings in the wall of the spindle. In this instance I have shown four vertical rows or series of tubular projections but it is to be understood of course that the number of rows or series may be greater or less than that shown as will be found necessary, and the number of tubes in each row may be varied as desired. Located in the spindle a short distance above the uppermost tubular projections is a plug or partition 36 which limits the upward movement of the milk through the spindle. A short distance above the partition 36 are a number of vent holes or openings 37 for the escape of air from the receptacle. Surrounding the spindle 30 is a casing 38 having in this instance a cone shaped base 39, which rests upon a ledge or shoulder 40ª at the bottom of the bowl and having a centrally located opening which fits over the boss 24, and an elongated body portion having a plurality of projecting ridges 40, the number of which is equal to the number of vertical rows of tubular projections and into which the tubular projections 35 extend. Each of the ridges 40 is provided in line with the openings in the tubular projections 35 with an elongated vertical slot 41.

Surrounding the casing 38 is a liner 42 which is formed in this instance from a continuous metal strip spirally arranged, the turns or layers being spaced apart, by members 43 which in this case are depressions formed in the surface of the metal. The turns of the spirally arranged strip or disks are notched as shown at 44 to receive the ridges 40 of the casing. The cream which collects around the spindle passes upward between the inner edges of the liner or turns of the spirally arranged strip and the portions of the vertical wall of the casings located between the slotted ends of the projecting ridges through which the milk from the spindle passes. As the ridges extend a considerable distance outward beyond the inner edges of the liner, the streams of milk passing through the slots of said ridges can not interfere with the upward flow of cream.

Adjacent the inner wall of the bowl are a plurality of vertical tubes 45 for conveying from the bowl the skim milk which collects at the outer portions of the interior thereof. These tubes which may be secured to the inner wall of the bowl by solder or any other suitable means, are provided with a plurality of perforations or openings 46 throughout their length for the admission of the skim milk, and are connected at their upper ends with means for conveying milk upward and toward the spindle, which means consists in this case of passageways 47 cored in the conical portion 18 of the bowl, which passageways have openings 48 at their upper ends from which the skim milk may pass into a suitable receptacle.

Located in the chamber 12 below the bowl is a socket member 49 provided with an opening 50 which receives the lower end of the tube 22, and with a threaded opening 51 which receives the end of a milk supply pipe 52. The socket member 49 is pressed upwardly against the lower end of the tube, to prevent the leakage of milk, by a spring 53 located between the lower wall of the chamber and the bottom of the socket member. The socket member is provided with a shoulder 54 against which the lower end of the tube bears, a washer 55 of felt or other soft material being interposed between the lower end of the tube and the shoulder. The milk supply pipe 52 is adapted to be connected to a suitable tank and may be provided with a valve for regulating the flow of milk to the receptacle.

When the bowl is rotated, preferably by a driving member which may be attached to the upper end of the hollow spindle 30, the rotating parts reduce the air pressure in the bowl, causing a partial vacuum therein, so that the milk flows from the supply tank into the spindle 30 lifting the valve 27 until it engages the fingers 31 on the lower end of the spindle, the milk passing through the tubular extensions in the spindle onto the surfaces of the liner. The cream collects near the center and passes upward along the wall of the casing 38 into the passageway between the spindle 30 and the neck portion 19 and through the opening 33 in the ring or collar 32 into a suitable receptacle. The skim milk collects near the outer edges of the liner, passes into the vertical tubes 45 and is carried upward through the passageways 47 and out through the openings 48 into a suitable receptacle. By providing vent holes in the spindle for the escape of air that might be carried into the spindle with the milk, "blubbering" is prevented and the efficiency of the separator is improved. If the rotation is stopped, the valve 27 drops back into the upper end of the tube 22 thereby preventing a backward flow of the milk from the bowl. In case a sufficient quantity of milk can not be forced through the bowl in the manner explained above, the flow can be enhanced by providing in the bowl or tube 22 suitable fans or blades 22′.

It will be seen that as the milk is drawn into the bowl by the partial vacuum created therein, it will be unnecessary to place the supply tank at a considerable height above the bowl, consequently less handling and lifting of the milk will be necessary. Since the skim milk passes in the tubes 45 there is less danger of the rotating parts particularly the passageways between the layers of the liner being clogged by curd or fatty substances, as is the case when the skim milk in passing out of the receptacle flows along the outer edges of the liner. If it is desired to clean or inspect the parts the upper part of the bowl or receptacle can be unscrewed and removed leaving the liner and other parts exposed to view. The liner can then be easily cleaned.

I do not desire to be confined to the exact details shown but aim in my claims to cover all modifications which do not involve a departure from the spirit and scope of my invention.

Having described my invention, I claim,

1. In a cream separator, in combination, a rotary bowl having a tubular projection at the bottom thereof, a milk supply connected to said tubular projection, and a valve adapted to be opened by the flow of milk into the bowl and to automatically close to prevent the backward flow of milk from said bowl when the rotation of the latter is stopped.

2. In a cream separator, in combination, a rotary bowl having a hollow tubular projection at the bottom thereof and adapted to rotate therewith, and a normally stationary socket member having a milk supply pipe connected thereto and receiving the lower end of said tubular projection, and means for yieldingly pressing said socket member upward into engagement with the latter.

3. In a cream separator, in combination, a rotary bowl, a hollow feed tube extending therein, a plurality of laterally extending tubular projections carried by said feed tube, a separator casing surrounding the feed tube and having vertically disposed radially extending hollow projections each provided with an outlet opening at its outer edge, said hollow projections being adapted to receive the milk from the lateral tubular projections and a liner surrounding said casing.

4. In a cream separator, in combination, a rotary bowl, a hollow feed tube extending therein, said tube having series of lateral tubular projections, a casing surrounding said feed tube and having slots opposite the tubular projections, and a separate liner surrounding said casing.

5. In a cream separator, in combination, a rotary bowl, a hollow feed tube extending therein, means for supplying milk to the bottom of said feed tube, a plurality of rows of hollow tubes extending laterally from said feed tube, a casing surrounding said feed tube, said casing having vertical slotted extensions receiving said laterally extending tubes, and a removable liner surrounding said casing.

6. In a cream separator, in combination, a rotary bowl having a feed tube adapted to be connected to a source of milk supply, a liner in said bowl and adapted to rotate therewith, said bowl having a passageway for conveying the cream therefrom, and a plurality of perforated tubes between the wall of the bowl and the outer periphery of the liner for conveying the skim milk from said bowl.

In testimony whereof, I affix my signature in the presence of two witnesses.

HOMER O. FISHER.

Witnesses:
ARTHUR F. KWIS,
RAE WEISS.